(12) United States Patent
Hashikura

(10) Patent No.: US 6,425,085 B2
(45) Date of Patent: *Jul. 23, 2002

(54) TERMINAL DEVICE AND METHOD FOR REQUESTING USER CERTIFICATION FROM HOST COMPUTER

(75) Inventor: Hideki Hashikura, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 145 days.

(21) Appl. No.: 09/116,921

(22) Filed: Jul. 17, 1998

(30) Foreign Application Priority Data

Jul. 17, 1997 (JP) ............................................. 9-192465

(51) Int. Cl.$^7$ .............................................. G06F 12/14
(52) U.S. Cl. ....................................... 713/202; 709/225
(58) Field of Search ............................. 712/1; 709/201, 709/225; 713/172, 201, 202

(56) References Cited

U.S. PATENT DOCUMENTS

| | | | | | |
|---|---|---|---|---|---|
| 4,196,310 A | * | 4/1980 | Forman | ........................ | 380/46 |
| 5,261,070 A | * | 11/1993 | Ohta | ........................... | 713/202 |
| 5,721,780 A | * | 2/1998 | Ensor | ........................... | 380/25 |
| 5,887,140 A | * | 3/1999 | Itsumi | ......................... | 709/225 |
| 6,055,638 A | * | 4/2000 | Pascal | ......................... | 713/201 |
| 6,067,621 A | * | 5/2000 | Yu | .............................. | 713/172 |
| 6,084,977 A | * | 7/2000 | Borza | .......................... | 382/124 |
| 6,237,023 B1 | | 5/2001 | Yoshimoto | .................. | 709/203 |

* cited by examiner

Primary Examiner—Eric Coleman
(74) Attorney, Agent, or Firm—Fitzpatrick, Cella, Harper & Scinto

(57) ABSTRACT

A terminal device generates and transmits to a host computer a user certification code formed by combining a unique password input by a user and a unique code stored in the terminal device when the host computer requests a password from the terminal device. The host computer uses the certification code to perform user certification. Thereby, if a password assigned to one user is used, the host computer cannot be accessed by a terminal device other than the user's terminal device. Thus, security can be maintained, even if another person knows the password.

18 Claims, 4 Drawing Sheets

INPUT PASSWORD        ASD3@2
IDENTIFICATION CODE   SN826302
COMPOSITE PASSWORD    SN826302ASD3@2

ADDRESS 1000

TERMINAL DEVICE AND METHOD FOR REQUESTING USER CERTIFICATION FROM HOST COMPUTER

BACKGROUND OF THE INVENTION

1. Field of the Invention

The present invention relates to a terminal device and method for requesting user certification from a host computer when accessing the host computer.

2. Description of the Related Art

According to conventional user certification used when a server host computer is accessed from a terminal device, it is common for the host computer to request a user to input a password and to identify the user as authentic if the input password is the same as a registered password.

Therefore, there is a serious problem in that, if another person knows the user's password, the person can use it to access the host computer.

SUMMARY OF THE INVENTION

Accordingly, it is an object of the present invention to provide a user certification system for preventing a host computer from being accessed by a person other than a user, even If the person knows the user's password, and a terminal device for requesting user certification from the host computer.

In addition, it is another object of the present invention to provide a user certification system capable of preventing access to a host computer from a terminal device other than that of the user operated by a person impersonating the user, and a terminal device for use with the system.

To these ends, according to an aspect of the present invention, the foregoing objects have been achieved through provision of a terminal device capable of accessing a host computer which performs user certification based on a certification code received from the terminal device, including: input means for inputting a password assigned to a user; storage means for holding unique information about the terminal device; generating means for generating a certification code based on the password and the unique information; and transmitting means for transmitting the certification code to the host computer.

According to another aspect of the present invention, the foregoing objects have been achieved through provision of a method for a terminal device to request user certification from a host computer which performs user certification based on a certification code received from the terminal device, the method including the steps of: inputting a password assigned to a user; reading unique information stored In the terminal device; generating a certification code based on the password and the unique information; and transmitting the certification code to the host computer.

According to a further aspect of the present invention, the foregoing objects have been achieved through provision of a user certification system including a host computer and a plurality of terminal devices capable of accessing the host computer, in which the plurality of terminal devices each include: input means used to input a password assigned to a user; storage means for holding unique information about the terminal device; generating means for generating a certification code based on the password and the unique information; and transmitting means for transmitting the certification code to the host computer, and the host computer includes: receiving means for receiving the certification code; and certification means for performing user certification based on the received certification code.

According to yet another aspect of the present invention, the foregoing objects have been achieved through provision of a computer-readable storage medium holding an information processing program for controlling a computer in a terminal device to request user certification from a host computer, the program including codes for causing the computer to perform the steps of: inputting a password assigned to a user; reading unique information stored in the terminal device; generating a certification code based on the password and the unique information; and transmitting the certification code to the host computer.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENT

One preferred embodiment of the present invention will be described below, with reference to the attached drawings.

An outline of the embodiment is that, with unique identification codes (e.g., serial numbers) assigned to terminal devices, each terminal device sends one identification code together with a password input by a user in response to a password request from a host computer, and the host computer uses the sent identification code and password to perform user certification. In this manner, if a certain user's password was leaked to another person, the person cannot be authenticated unless the person inputs the user's password from the user's terminal device to the host computer. In other words, access to the host computer using the leaked password is impossible.

Figure 1:
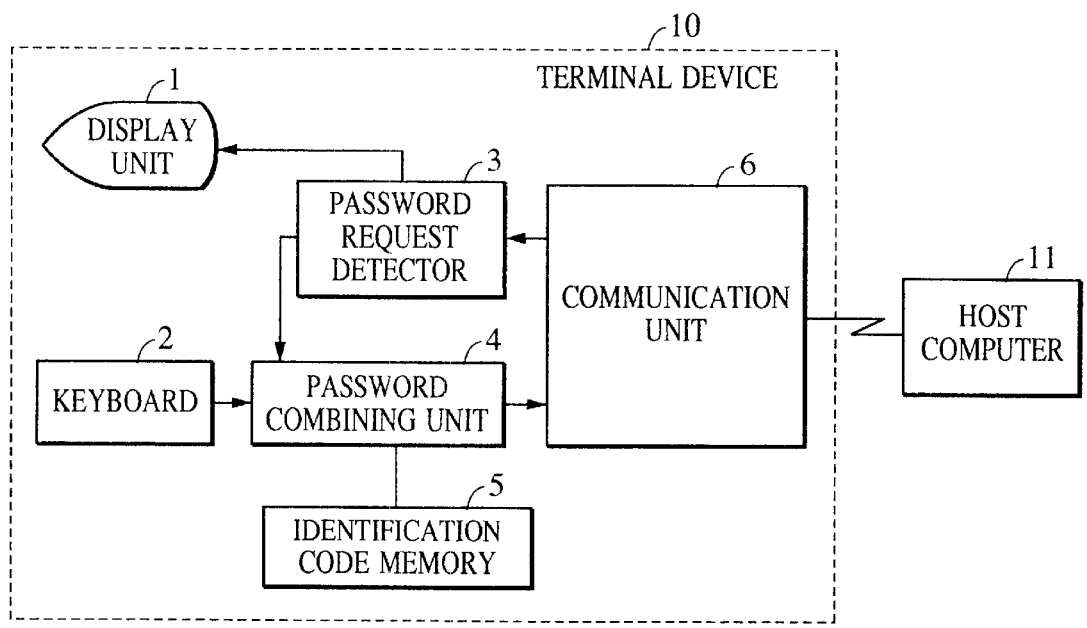
FIG. 1 is a functional block diagram showing a terminal device according to an embodiment of the present invention.

FIG. 1 shows a block diagram of a terminal device 10 according to the embodiment. A display unit 1 displays information such as a message. A keyboard 2 is used to input ordinary character strings, commands and passwords. A password request detector 3 detects a password request from information received from a host computer 11. An identification code memory 5 holds as non-volatile information an identification code unique to the terminal device 10. A password combining unit 4 combines a password input from the keyboard 2 and the identification code stored in the identification code memory 5. A communication unit 6 receives the password request etc. from the host computer 11, and transmits a communication request and a password to the host computer 11.

Figure 2:
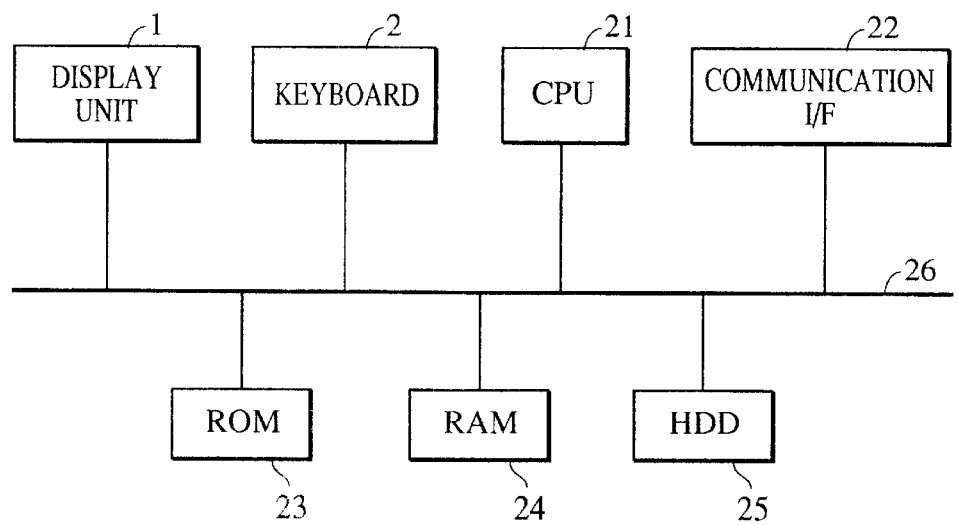
FIG. 2 is a hardware block diagram showing the terminal device shown in FIG. 1.

FIG. 2 shows a hardware block diagram of the terminal device 10. A central processing unit (CPU) 21 controls the units of the terminal device 10, and executes various programs stored in a read only memory (ROM) 23 and a hard disk drive (HDD) 25. In particular, the CPU 21 realizes the functions of the password request detector 3 and the password combining unit 4. A communication interface (I/F) 22 realizes communication with the communication unit 6 between the terminal device 10 and the host computer 11. The ROM 23 holds fixed data and programs so that they cannot be rewritten, and includes an area to be used as the identification code memory 5. A random access memory (RAM) 24 is used as a work area for the CPU 21, and temporarily holds data such as an input password. The HDD 25 holds various data and programs as non-volatile information. Also programs corresponding to processes (described below with flowcharts) are stored in either the ROM 23 or the HDD 25. In place of the HDD 25 as a non-volatile storage unit, a floppy disk drive or the like may be provided, or all necessary programs may be stored in the ROM 23 without particularly providing a non-volatile storage unit like the HDD 25.

A user certification process will be described below. Initially, when the communication between the terminal device 10 and the host computer 11 is established in response to an access request from the user of the terminal 10, the host computer 11 transmits an input request to the terminal device 10 for a user name and a password.

Figures 3, 4:
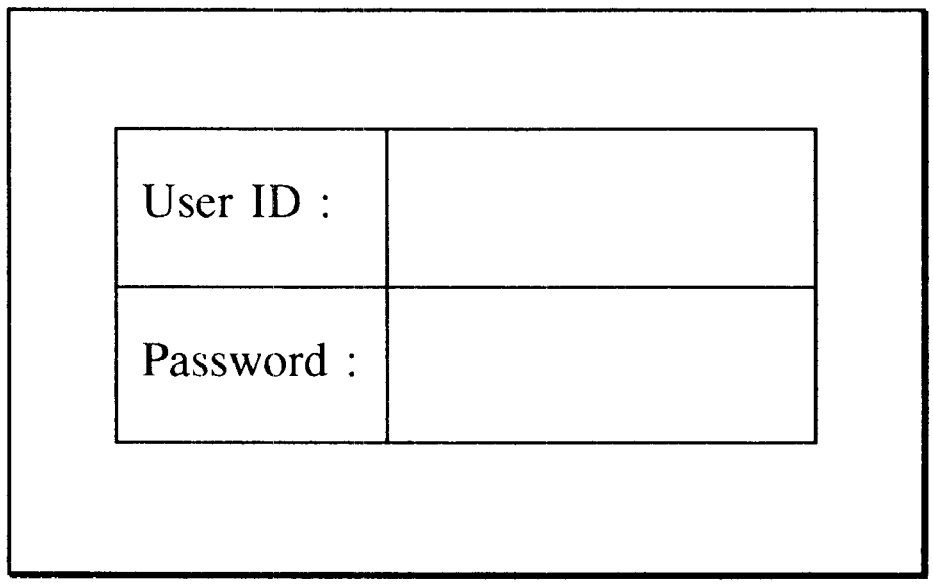
FIG. 3 is an example of an image displayed when a password is requested.
FIG. 4 is a drawing showing an example of a certification code.

The password request issued from the host computer 11 is input to the password request detector 3 via the communication unit 6. As described below, the password request detector 3 sends ordinary characters unchanged to the display unit 1 when receiving them, while the password request detector 3 sends a password request message to the display unit 1 for setting a password mode and informs the password combining unit 4 of a password request when the request is received. An example of an image displayed on the display unit 1 in accordance with the password request is shown in FIG. 3. When a password is input from the keyboard 2 in response to the password request, the password combining unit 4 reads an identification code from the identification code memory 5, and combines the identification code and the password.

One example of password combining is shown in FIG. 4. In this example, a composite password is formed by adding the input password to the end of the identification code. The composite password formed by the password combining unit 4 is transmitted to the host computer 11 via the communication unit 6. The host computer 11 performs user certification, based on the composite password. In the host computer 11, passwords formed in the above manner by combining the identification codes of terminal devices and the passwords of the terminal devices' users have been registered beforehand.

Figure 5:
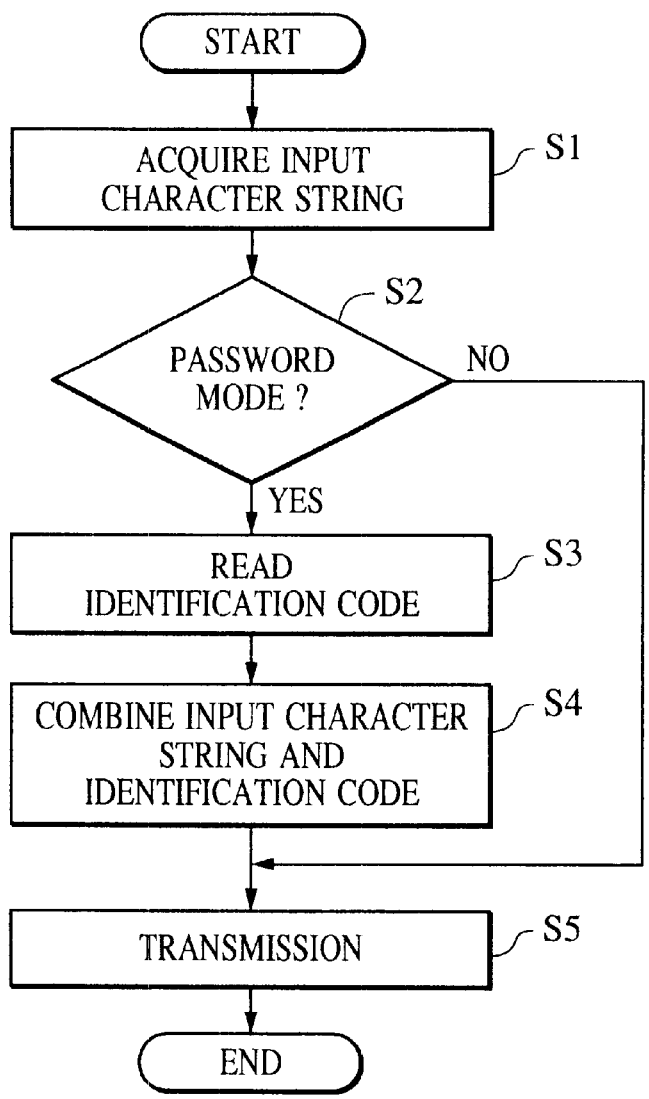
FIG. 5 is a flowchart showing a process for password combining.

FIG. 5 shows a flowchart illustrating a password combining process. In step S1, a character string input from the keyboard 2 by the user is acquired. In step S2, it is determined whether or not the present mode is a password mode. If the present mode is not a password mode, the process proceeds to step S5. If the present mode is a password mode, the process proceeds to step S3, in which the identification code stored in the identification code memory 5 is read. In step S4, the acquired character string and the identification code are combined. In step S5, the composite character string formed in the password mode, or a character string input in non-password mode is transmitted by the communication unit 6.

Figure 6:
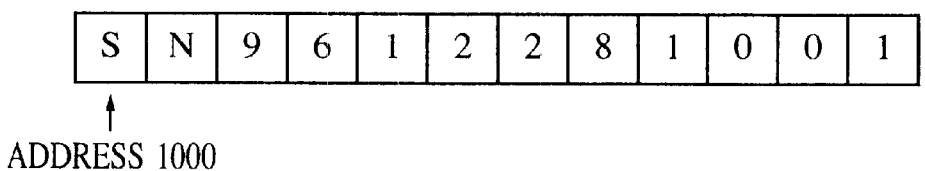
FIG. 6 is an example of the format of an identification code.

FIG. 6 shows one example of the format of the identification code stored in the identification code memory 5. The terminal device 11 can be uniquely identified based on the identification code. The identification code memory 5 is formed at specific addresses of the ROM 23 etc.

Figure 7:
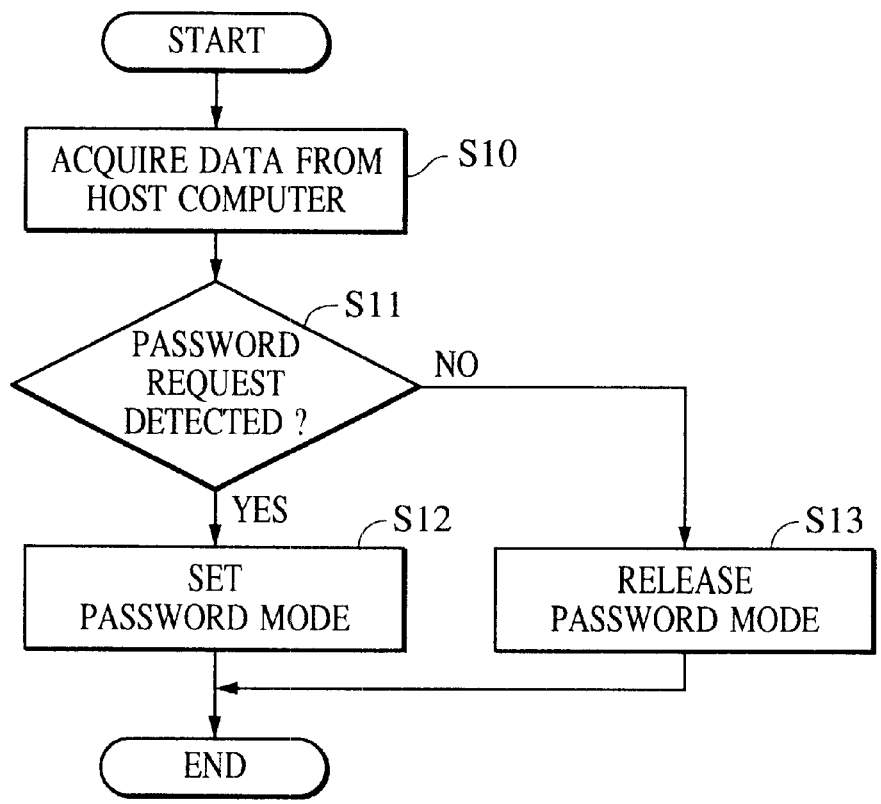
FIG. 7 is a flowchart showing a process for detecting a password request.

FIG. 7 shows a flowchart illustrating a process for detecting a password request. Data (characters) transmitted from the host computer 11 are received by the communication unit 6, and the data are sent to the password request detector 3. In step S10, the communication unit 6 is used to acquire data from the host computer 11. In step S11, the password request detector 3 determines whether the received data are a password request or ordinary data. If the received data is ordinary data, the password mode is released in step S13. If the received data is a password request, the process proceeds to step S12, in which the password mode is set.

Figure 8:
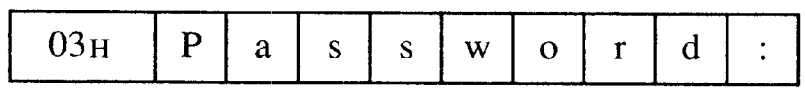
FIG. 8 is an example of the format of a password request command.
Figure 9:
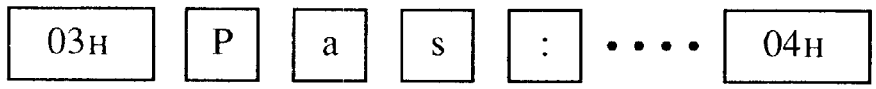
FIG. 9 is another example of the format of a password request command.

FIG. 8 shows one example of the format of a password request command. Based on the format, the password request detector 3 determines whether the data from the host computer 11 are password data or ordinary data. In FIG. 8, the character string has at its start a code ("03" in hexadecimal) that is different from a character code, which allows the character string to be discriminated from ordinary data. FIG. 9 shows another example of the format of the password request command. In FIG. 9, "03" in hexadecimal represents the start of a password request command, and "04" in hexadecimal represents the end of the password request command.

As described above, according to this embodiment, a user's password and a code unique to each terminal device are used to form a composite password, and the composite password is used for user certification. Thus, if a person other than the user knows the user's password, that person cannot access a host computer unless using the user's terminal device, thereby preventing serious damage and security breaches.

The type of the terminal device 10 is not limited to a desktop type but may be a portable type. Concerning the portable type of terminal device 10, when it is carried by its user, a person other than the user cannot access the host computer 11, even if that person knows the password.

In the case where an identical user uses a plurality of terminal devices, composite passwords formed by combining the identification codes of the terminal devices and the user's password are registered in a host computer, whereby the user can use the plurality of terminal devices with the same password, and the host computer cannot be accessed from the other terminal devices, using the same password. Thus, if the password was leaked to a person other than the user, the host computer cannot be accessed by the person.

In the foregoing embodiment, the terminal device 10 combines an input password and a read identification code to generate a new password, and transmits it to the host computer 10. However, with the password and the identification code transmitted to the host computer 11, they may be combined by the host computer 11. Otherwise, the host computer 11 may perform user certification by independently verifying the password and the identification code.

In the foregoing embodiment, password combining is performed by simply combining an input password and a read identification code. However, logical operations such as a logical sum and an exclusive OR, a transpose, and a permutation may be properly combined. In addition, such a type of combining process may be stored as a unique process in the ROM 23 of each terminal device. In this case, without using the identification code, only the password may be processed by the unique process.

In the foregoing embodiment, a user inputs a password from a keyboard whenever a host computer transmits a password request. However, in the case where the user's terminal device cannot be used by a person other than the user, in order that time for inputting the password may be omitted, by once inputting the password from the keyboard so that the password can be stored in the hard disk drive of the terminal device, the stored password may be read in response to the password request.

According to the foregoing embodiment, if a person other than a user knows the user's password, a host computer cannot be accessed with the password by a terminal device other than the user's device, whereby serious damage and security breaches are prevented.

According to the present invention, main necessary units are realized by software, whereby they can be inexpensively formed.

The present invention may be applied to a system composed of plurality of apparatuses (e.g., main computer unit, interface unit, and display) and to a one-unit apparatus as far as the functions of the embodiment are realized.

In addition, the present invention includes also a system in which, in order that each unit may operate to realize the functions of the embodiment, a software program code that realizes the functions of the embodiment is supplied to a computer (CPU or microprocessor unit) in an apparatus or system connected to each unit, and each unit is controlled to operate by the computer in the apparatus or system in accordance with the supplied code. In this case, the program code read from a storage medium realizes the functions of the embodiment. Accordingly, the program code, means for supplying the program code to the computer, such as a storage medium holding the program, constitute the present invention.

Concerning the storage medium for supplying the program code, for example, a floppy disk, a hard disk, an optical disk, a magneto-optical disk, a CD-ROM, a CD-R, a magnetic tape, a non-volatile memory card, a ROM, and so forth, may be used.

In a system in which a computer executes a read program code, whereby the functions of the embodiment are realized and based on the program code, the functions of the embodiment are realized in association with an operating system or application software functioning in the computer, needless to say, the program code is included in the scope of the present invention.

Needless to say, the present invention includes a system in which a program code read from a storage medium is written In a memory of a feature expansion board provided on a computer or feature expansion unit connected to the computer, and based on the program code, all or part of actual processing is performed by a CPU provided on the feature expansion board or feature expansion unit. whereby realizing the functions of the embodiment.

When the present invention is applied to the storage medium, a program code corresponding to the above-described flowcharts may be stored in the storage medium.

Although the present invention has been described in its preferred form with a certain degree of paricularity, many apparently widely different embodiments of the invention can be made without departing from the spirit and the scope thereof. It is to be understood that the invention is not limited to the specific embodiment thereof except as defined in the appended claims.

What is claimed is:

1. A terminal device with a function of accessing a host computer that performs user certification based on a certification code received from said terminal device, comprising:
   an input unit adapted to input a password assigned to a user;
   a storage unit adapted to store information unique to said terminal device;
   a generation unit adapted to generate a certification code based on the password and the unique information; and
   a transmission unit adapted to transmit the certification code to the host computer.

2. A terminal device according to claim 1, wherein the unique information is an identification code for said terminal device that is unique to said terminal device.

3. A terminal device according to claim 2, wherein said generation unit combines the password and the identification code to generate the certification code.

4. A terminal device according to claim 2, wherein said generation unit generates the certification code by using a predetermined computation for processing the password and the identification code.

5. A terminal device according to claim 2, wherein said generation unit generates as the certification code a combination of the password and the identification code.

6. A terminal device according to claim 1, wherein
   the unique information is a process for processing the password, and
   said generation unit generates the certification code by processing the password based on the process of the unique information.

7. A terminal device according to claim 1, further comprising a detection unit adapted to detect a password request from the host computer, wherein, when the password request is detected by said detection unit, said generation unit generates the certification code.

8. A terminal device according to claim 7, wherein said detection unit detects the password request by detecting a predetermined code from information received from the host computer.

9. A method for a terminal device to request user certification from a host computer that performs user certification based on a certification code received from the terminal device, said method comprising the steps of:
   inputting a password assigned to a user;
   reading information unique to the terminal device that is stored in the terminal device;
   generating a certification code based on the password and the unique information; and
   transmitting the certification code to the host computer.

10. A method according to claim 9, wherein the unique information is an identification code for the terminal device that is unique to the terminal device.

11. A method according to claim 10, wherein, in said generating step, the password and the identification code are combined to generate the certification code.

12. A method according to claim 10, wherein, in said generating step, the password and the identification code are processed by a predetermined computation to generate the certification code.

13. A method according to claim 10, wherein, in said generating step, a combination of the password and the identification code is generated as the certification code.

14. A method according to claim 9, wherein
the unique information is a process for processing the password, and,
in said generating step, the password is processed based on the process of the unique information to generate the certification code.

15. A method according to claim 9, further comprising the step of detecting a password request from the host computer, wherein, when the password request is detected in said detecting step, said generating step is performed.

16. A method according to claim 15, wherein, in said detecting step, the password request is detected by detecting a predetermined code from information received from the host computer.

17. A user certification system comprising a host computer and a plurality of terminal devices each with a function of accessing the host computer,
wherein said plurality of terminal devices each include:
an input unit adapted to input a password assigned to a user;
a storage unit adapted to store information unique to the terminal device;
a generation unit adapted to generate a certification code based on the password and the unique information; and
a transmission unit adapted to transmit the certification code to the host computer, and
wherein said host computer includes:
a receiver adapted to receive the certification code; and
a certification unit adapted to perform user certification based on the received certification code.

18. A computer-readable storage medium storing an information processing program for a method of controlling a computer in a terminal device to request user certification from a host computer, the program comprising codes for causing the computer to perform the steps of:
inputting a password assigned to a user;
reading information unique to the terminal device that is stored in the terminal device;
generating a certification code based on the password and the unique information; and
transmitting the certification code to the host computer.

* * * * *